US008528599B2

(12) United States Patent
Morgan et al.

(10) Patent No.: US 8,528,599 B2
(45) Date of Patent: Sep. 10, 2013

(54) PULSE WIDTH MODULATED SOLENOID

(75) Inventors: Kenneth W. Morgan, Lake Orion, MI (US); Thomas J. Hemak, Troy, MI (US); Aaron Wolfson, Ferndale, MI (US); Thomas A. Horn, Eastpointe, MI (US); Gregory S. Lewis, Clinton Township, MI (US); Howard Saxon, Clinton Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 1362 days.

(21) Appl. No.: 10/989,616

(22) Filed: Nov. 16, 2004

(65) Prior Publication Data

US 2005/0121089 A1    Jun. 9, 2005

Related U.S. Application Data

(60) Provisional application No. 60/525,358, filed on Nov. 26, 2003.

(51) Int. Cl.
 *F16K 31/06* (2006.01)
(52) U.S. Cl.
 USPC ............... 137/625.65; 137/596.1; 137/596.17
(58) Field of Classification Search
 USPC ....... 137/596.17, 625.65, 596.1; 251/129.14, 251/129.07
 See application file for complete search history.

(56) References Cited

U.S. PATENT DOCUMENTS

| 4,338,966 | A | * | 7/1982 | Smith | 137/596.17 |
|---|---|---|---|---|---|
| 4,746,094 | A | * | 5/1988 | Cummins | 251/129.14 |
| 4,998,559 | A | * | 3/1991 | McAuliffe, Jr. | 137/596.17 |
| 5,174,336 | A | * | 12/1992 | Casey et al. | 137/625.65 |
| 5,577,534 | A | * | 11/1996 | Ward | 137/596.17 |
| 5,630,569 | A | * | 5/1997 | Oehler et al. | 251/129.15 |
| 5,651,391 | A | | 7/1997 | Connolly et al. | |
| 5,669,406 | A | * | 9/1997 | Gluf, Jr. | 137/270 |
| 6,209,563 | B1 | * | 4/2001 | Seid et al. | 137/15.21 |
| 6,719,267 | B2 | * | 4/2004 | Torii et al. | 251/129.15 |
| 2002/0092998 | A1 | * | 7/2002 | Torii et al. | 251/129.15 |
| 2004/0118463 | A1 | * | 6/2004 | Yamamoto | 137/625.65 |

* cited by examiner

*Primary Examiner* — Craig Schneider
*Assistant Examiner* — Craig J Price
(74) *Attorney, Agent, or Firm* — Warn Partners, P.C.

(57) ABSTRACT

A pulse width modulated solenoid system having low noise characteristics is described. Noise reduction is primarily achieved by separating the solenoid device from the insulator and the manifold housing through the use of rubber isolators and multiple sets of o-rings, thus preventing metal to metal contact. Additional noise reduction is achieved by encapsulating all of the solenoids, using the insulator, the cover plate, the housing, and the screen carrier. Noise levels are also further reduced by minimizing the impact force of the armature against the sleeve by allowing fluid to vent into the upper area of the sleeve, thus causing a dampening effect.

31 Claims, 6 Drawing Sheets

PULSE WIDTH MODULATED SOLENOID

CROSS-REFERENCE TO RELATED APPLICATIONS

The present invention claims priority to U.S. Provisional Patent Application Ser. No. 60/525,358, filed Nov. 26, 2003, the entire specification of which is expressly incorporated herein by reference.

FIELD OF THE INVENTION

The present invention relates generally to solenoids and more particularly to pulse width modulated solenoid systems having low noise characteristics.

BACKGROUND OF THE INVENTION

Solenoids have been used to provide a number of functions in automotive applications including, but not limited to use in automatic transmission systems and the like. For example, the control system of an automatic transmission is typically hydraulically operated through the use of valves which direct and regulate the supply of pressure. This hydraulic pressure control causes either actuation or de-actuation of frictional members for affecting gear changes in the transmission.

More recently, automatic transmission designs have included adaptive control systems which utilize electrically operated solenoid-actuated valves for controlling various fluid pressures. However, current solenoid-actuated valve designs have their shortcomings. For example, vibrationally-transmitted impact noise during shifting results in a chattering effect from solenoid actuation. This chattering can be a result of the pulse width modulated (PWM) electronic drive signal which actuates the solenoids. This can occur under step shifting conditions in which the solenoid ramps from 0 to 100 percent duty cycle or vice versa. The vibrational energy generated is at the excitation PWM frequency, as well as the higher order multiple of the drive frequency. This vibrational energy directly transmits from the solenoid through its mounting interface into the transmission housing. The presence of excessive noise and vibration levels is typically undesirable and potentially leads to customer dissatisfaction.

One approach to overcoming this problem is found in commonly-assigned U.S. Pat. No. 5,651,391, the entire disclosure of which is expressly incorporated herein by reference, which discloses a solenoid-actuated valve assembly with reduced noise characteristics. More specifically, a rubber retainer and steel retainer secure the valve within a manifold, wherein the rubber retainer absorbs longitudinal vibrations. A plurality of rubber gaskets surround the body of the valve and prevent metal-to-metal contact between the valve body and the manifold for cushioning lateral vibrations of the valve. However, this approach uses a unitary rubber retainer that extends along most of the length of the solenoid assembly, with corresponding raised portions for shrouding the top portions of the respective individual solenoids. This approach is wasteful in that excessive material must be used to manufacture the rubber retainer, as well as being fairly inadaptable, in that it cannot be easily modified should the solenoid assembly layout design be changed later.

Therefore, there exists a need for new and improved pulse width modulated solenoid systems having low noise characteristics.

SUMMARY OF THE INVENTION

In accordance with the general teachings of the present invention, new and improved pulse width modulated solenoid systems having low noise characteristics are provided.

More specifically, the present invention preferably provides a solenoid-actuated valve system (e.g., a three-way system) that is vibrationally isolated from the manifold by an isolator member and at least one gasket member (e.g., an o-ring), that are preferably comprised of a resiliently deformable material, such as but not limited to rubber. The present invention further preferably provides a sleeve member (e.g., comprised of a non-magnetic material) disposed within the solenoid and substantially surrounding the armature so as to form a dampening portion therebetween, wherein a fluid (e.g., transmission fluid) is operable to be vented to the dampening portion. Additionally, the armature member is preferably provided with at least one axial groove extending along the external surface thereof. Furthermore, a plunger member is preferably provided at least one axial scalloped flute portion extending along the external surface thereof.

Still more specifically, the present invention preferably provides a solenoid-actuated valve system with reduced noise characteristics. The system preferably includes a manifold member having at least one, and more preferably a plurality of bores, formed therein with a longitudinally extending solenoid-actuated valve member disposed within the bore. An insulator member is preferably disposed adjacent to a surface of the bore, and an isolator member (e.g., a round rubber member) is disposed between the insulator member and the valve member (e.g., in proximity to the solenoid portion thereof for cushioning vibrations (e.g., longitudinal vibrations) of the valve member for noise reduction. At least one, and more preferably a plurality, of gaskets (e.g., rubber o-rings) are preferably disposed about the valve member (e.g., in proximity to the valve portion thereof and cushion the valve member with respect to various surfaces (e.g., internal surfaces) of the bore, for cushioning vibrations (e.g., lateral vibrations) of the valve member for noise reduction purposes.

In accordance with a first embodiment of the present invention, a solenoid-actuated valve assembly with reduced noise characteristics is provided, comprising: (1) a manifold housing member having first and second bores formed therein; (2) a first solenoid-actuated valve member disposed within said first bore, said first solenoid-actuated valve member including a solenoid portion and a valve portion; (3) a second solenoid-actuated valve member disposed within said second bore, said second solenoid-actuated valve member including a solenoid portion and a valve portion; (4) an insulator member in proximity to said solenoid portions of said first and second solenoid-actuated valve members; (5) a first unitary isolator member disposed between said insulator member and said solenoid portion of said first solenoid-actuated valve member, said first isolator member operable to reduce vibration transmission from said solenoid portion of said first solenoid-actuated valve member to said insulator member; (6) a second unitary isolator member disposed between said insulator member and said solenoid portion of said second solenoid-actuated valve member, said second isolator member operable to reduce vibration transmission from said solenoid portion of said second solenoid-actuated valve member to said insulator member; (7) a first plurality of gasket members disposed about said valve portion of said first solenoid-actuated valve member, said first plurality of gasket members operable to reduce vibration transmission from said valve portion of said first solenoid-actuated valve member to said manifold housing member; and (8) a second plurality of gasket members disposed about said valve portion of said second solenoid-actuated valve member, said second plurality of gasket members operable to reduce vibration transmission from said valve portion of said second solenoid-actuated valve member to said manifold housing member.

In accordance with a second embodiment of the present invention, a solenoid-actuated valve assembly with reduced noise characteristics is provided, comprising: (1) a manifold housing member having a first and second longitudinally extending bores formed therein; (2) a first solenoid-actuated valve member disposed within said first bore, said first solenoid-actuated valve member including a solenoid portion and a valve portion; (3) a second solenoid-actuated valve member disposed within said second bore, said second solenoid-actuated valve member including a solenoid portion and a valve portion; (4) an insulator member in proximity to said solenoid portions of said first and second solenoid-actuated valve members; (5) a first unitary resiliently deformable isolator member disposed between said insulator member and said solenoid portion of said first solenoid-actuated valve member, said first isolator member operable to reduce vibration transmission from said solenoid portion of said first solenoid-actuated valve member to said insulator member; (6) a second unitary resiliently deformable isolator member disposed between said insulator member and said solenoid portion of said second solenoid-actuated valve member, said second isolator member operable to reduce vibration transmission from said solenoid portion of said second solenoid-actuated valve member to said insulator member; (7) a first plurality of resiliently deformable gasket members disposed about said valve portion of said first solenoid-actuated valve member, said first plurality of gasket members operable to reduce vibration transmission from said valve portion of said first solenoid-actuated valve member to said manifold housing member; and (8) a second plurality of resiliently deformable gasket members disposed about said valve portion of said second solenoid-actuated valve member, said second plurality of gasket members operable to reduce vibration transmission from said valve portion of said second solenoid-actuated valve member to said manifold housing member.

In accordance with a third embodiment of the present invention, a solenoid-actuated valve assembly with reduced noise characteristics is provided, comprising: (1) a manifold housing member having at least two bores formed therein; (2) at least two solenoid-actuated valve members disposed within said bores, said solenoid-actuated valve members including a solenoid portion and a valve portion; (3) an insulator member in proximity to said solenoid portions of said solenoid-actuated valve members; (4) at least two unitary isolator members, each of which are disposed between said insulator member and each of said solenoid portions, said isolator members operable to reduce vibration transmission from said solenoid portions to said insulator member; and (5) at least two gasket members, each of which are disposed about said valve portions, said gasket members operable to reduce vibration transmission from said valve portions to said manifold housing member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, and more specifically to FIGS. 1-4, there is shown a solenoid-actuated valve system generally at 10. In accordance with a preferred embodiment of the present invention, the system 10 is preferably a solenoid-actuated three-way valve system, although other types of valve systems are believed to be compatible with the practice of the present invention. In accordance with a highly preferred embodiment of the present invention, the system 10 is intended to be used in conjunction with transmission systems, specifically with respect to the control and/or delivery of transmission fluids therethrough.

Figure 1:
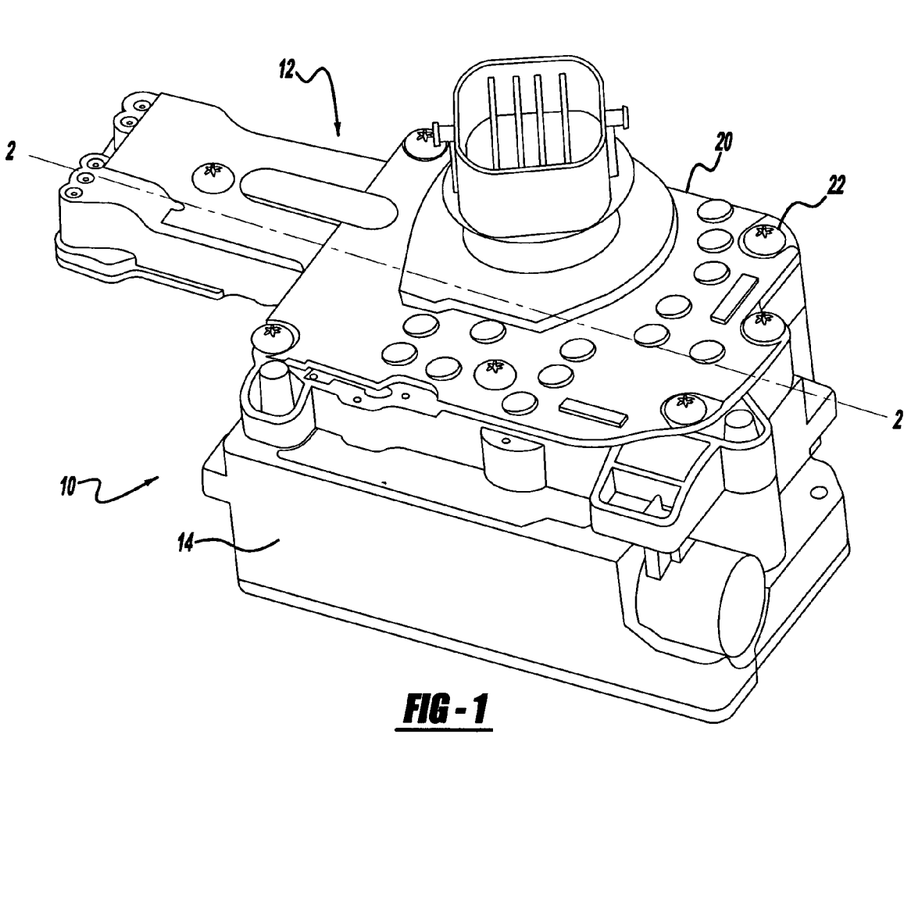
FIG. 1 illustrates a perspective view of a solenoid-actuated valve system, in accordance with the general teachings of the present invention.
Figure 2:
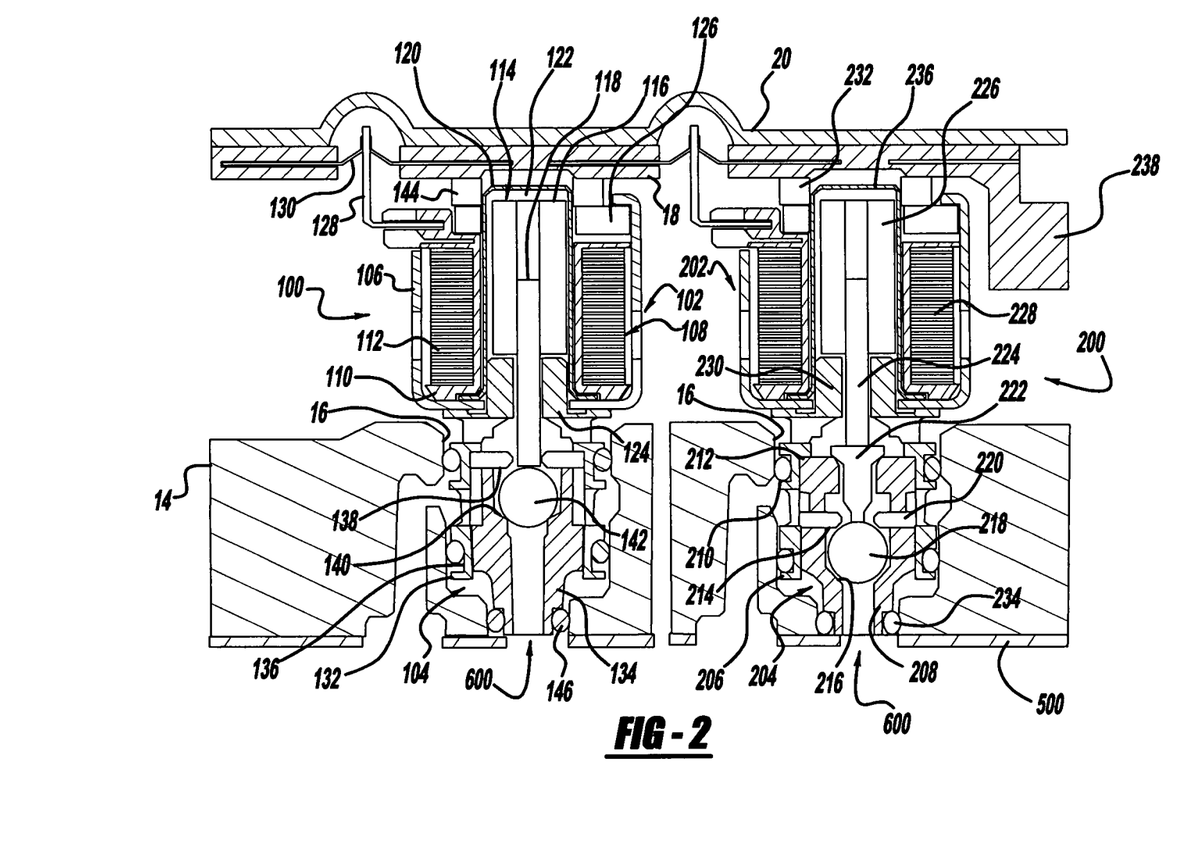
FIG. 2 illustrates a partial sectional view taken along line 2-2 of the solenoid-actuated valve system depicted in FIG. 1, in accordance with the general teachings of the present invention.

The system 10 preferably includes a manifold 12 that preferably includes a manifold housing 14 (e.g., a transmission manifold) having at least one, more preferably at least two, and still more preferably a plurality of bores 16 formed therein, the purpose of which will be explained herein. The manifold housing 14 also preferably includes an insulator member 18, a cover plate member 20, and one or more fastening members 22 (e.g., screws) operable to secure the cover plate member 20 to the manifold housing 14. The manifold 12 can preferably include other components, as are generally know in the art, including but not limited to location dowels, clutch return ports, solenoid bowl drain ports, element ports, supply ports, pressure switch ports, and/or the like.

In accordance with a preferred embodiment of the present invention, at least one, more preferably at least two, and still more preferably a plurality of valve members are provided. The valve members preferably include a solenoid portion and a valve portion in operable association therewith. In accordance with a preferred embodiment of the present invention, the valve members, and more specifically the valve portions thereof, are at least partially, and still more preferably substantially completely, disposed within the bores 16 of the manifold housing 14.

Figure 3:
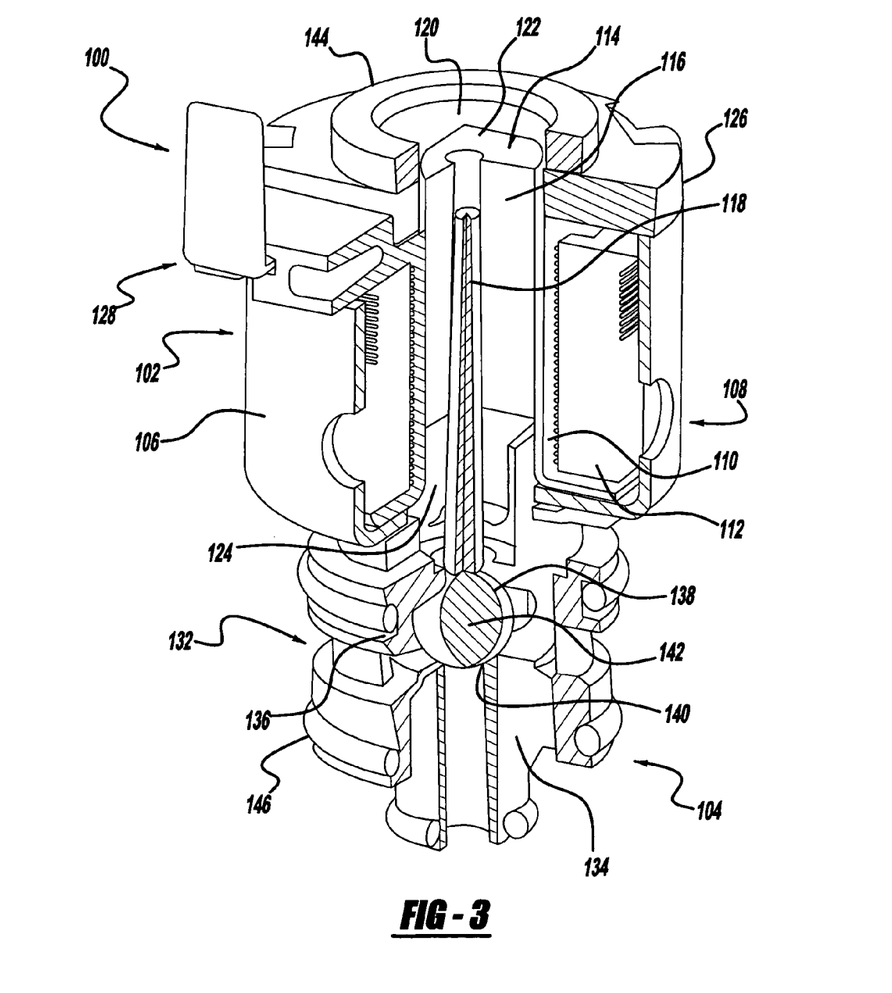
FIG. 3 illustrates a partially broken-away perspective view of a normally applied valve member, in accordance with the general teachings of the present invention.

Referring specifically to FIGS. 2 and 3, there is shown a normally applied valve member 100, including a solenoid portion 102 and a valve portion 104. The solenoid portion 102 thereof preferably includes a solenoid housing 106 or can enveloping a bobbin coil assembly 108 (including a bobbin member 110 and a coil member 112). The bobbin coil assembly 108 preferably envelopes an armature assembly 114 (including a selectively movable armature member 116 and a stem or pin member 118 extending therefrom). In accordance with a preferred embodiment of the present invention, optional crush teats can be incorporated into the top of the bobbin member 110 in order to control positioning of the bobbin member 110, e.g., during assembly, so as to prevent rotation once partially assembled. A sleeve member 120 preferably envelopes the armature member 116. The sleeve member 120 and the armature member 116 preferably define a dampening portion 122 within the interior of the sleeve member 120. A pole piece member 124 is preferably provided in proximity to the valve portion 104 and is preferably spaced and opposed from the dampening portion 122. An upper flux washer member 126 is preferably provided in proximity to the top surface of the solenoid housing 106. A terminal member 128 preferably extends from the bobbin member 110, and is preferably in communication with one or more electrical conduction members 130 (e.g., wires) associated with the insulator member 18.

Still referring to FIGS. 2 and 3, the valve portion 104 includes a valve housing 132 enveloping a retainer member 134 disposed therein. The external surface of the valve housing 132 is preferably provided with at least one, more preferably at least two, still more preferably at least three, and most preferably a plurality of annular grooves or shoulder portions 136, the purpose of which will be explained herein. The retainer member 134 preferably includes an upper seat portion 138 and a lower seat portion 140. Preferably disposed between the seat portions 138, 140, respectively, is a ball member 142 that is preferably operable to selectively move between the seat portions, 138, 140, respectively, thus allowing or not allowing the flow of transmission fluid through the valve portion 104. In accordance with a preferred embodiment of the present invention, when the coil member 112 is energized, the armature member 116 will be urged towards the pole piece member 124, thus causing the stem member 118 to contact the ball member 142. Conversely, when the coil member 112 is de-energized, the armature member 116 will not be urged towards the pole piece member 124, thus allowing the ball member 142 to push up the stem member 118 and cause the armature member 116 to return to its default position. In this general manner, the valve portion 104 can be selectively manipulated to control the flow of transmission fluid through the manifold 12.

In order to control the transmission of vibrations and/or noise that occurs when the valve member 100 is actuated, the present invention provides at least one, more preferably at least two, and still more preferably a plurality of isolator members 144 and/or gasket members 146 disposed about various locations of the valve member portion 100.

In accordance with a preferred embodiment of the present invention, an isolator member 144 is disposed about the top external surface of the sleeve member 120, i.e., disposed between the insulator member 18 and an upper flux washer member 126. Without being bound to a particular theory of the operation of the present invention, the intended purpose of the isolator member 144 is to cushion vibrations (e.g., longitudinal vibrations) of the valve portion 104 for noise reduction. The isolator member 144 is preferably comprised of a resiliently deformable material, including but not limited to a polymeric material such as rubber.

In accordance with a preferred embodiment of the present invention, at least one, more preferably at least two, still more preferably at least three, and most preferably a plurality of gasket members 146 (e.g., o-rings) are disposed about the external surface of the valve housing 132. Preferably, the gasket members 146 are received in the annular grooves and/or shoulder portions 136 and preferably abut the inner surfaces of the bore 16 (i.e., the manifold housing 14). Without being bound to a particular theory of the operation of the present invention, the intended purpose of the gasket members 146 is to cushion vibrations (e.g., lateral vibrations) of the valve portion 104 for noise reduction. The gasket members 146 are preferably comprised of a resiliently deformable material, including but not limited to rubber.

Figure 4:
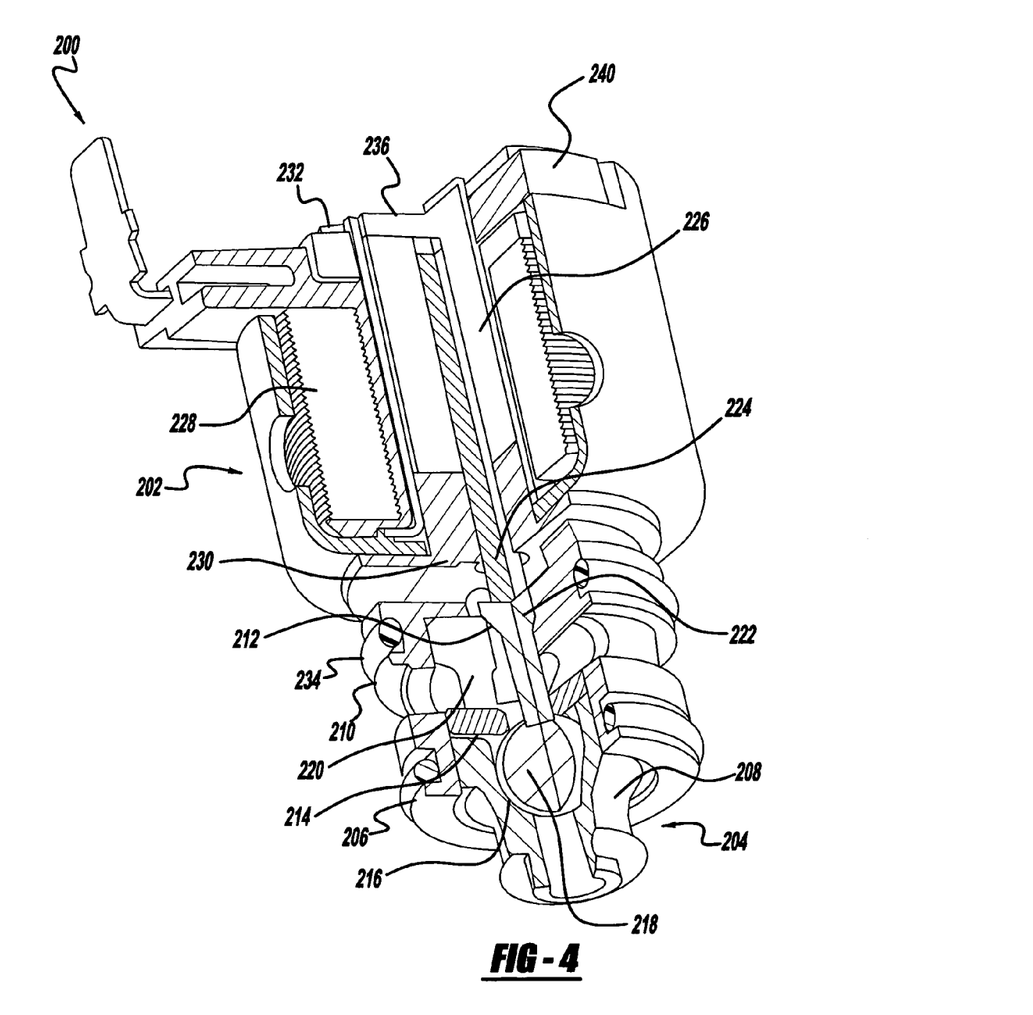
FIG. 4 illustrates a partially broken-away perspective view of a normally vented valve member, in accordance with the general teachings of the present invention.

Referring specifically to FIGS. 2 and 4, there is shown a normally vented valve member 200, including a solenoid portion 202 and a valve portion 204. The normally vented valve member 200 is somewhat similar to the normally applied valve member 100, but does have some significant differences as will be explained herein. However, the solenoid portion 202 is substantially identical in both embodiments.

Still referring to FIGS. 2 and 4, the valve portion 204 includes a valve housing 206 enveloping a retainer member 208 disposed therein. The external surface of the valve housing 206 is preferably provided with at least one, more preferably at least two, still more preferably at least three, and most preferably a plurality of annular grooves or shoulder portions 210, the purpose of which will be explained herein. The retainer member 208 preferably includes an upper seat portion 212, and intermediate seat portion 214, and a lower seat portion 216. Preferably disposed between the intermediate seat portion 214 and the lower seat portion 216 is a ball member 218 that is preferably operable to selectively move between the respective seat portions, thus allowing or not allowing the flow of transmission fluid through the valve portion 204. In accordance with a preferred embodiment of the present invention, overtravel of the ball member 218 in the retainer member 208 was minimized in order to optimize the movement of the ball member 218, thus helping the ball member 218 seal quickly and consistently during rapid operation. In accordance with a preferred embodiment of the present invention, the height and size of the valve portion 204 can also be reduced by a 2-sided stamped washer seat member 220, that can be installed either right side up or upside down.

Figure 7:
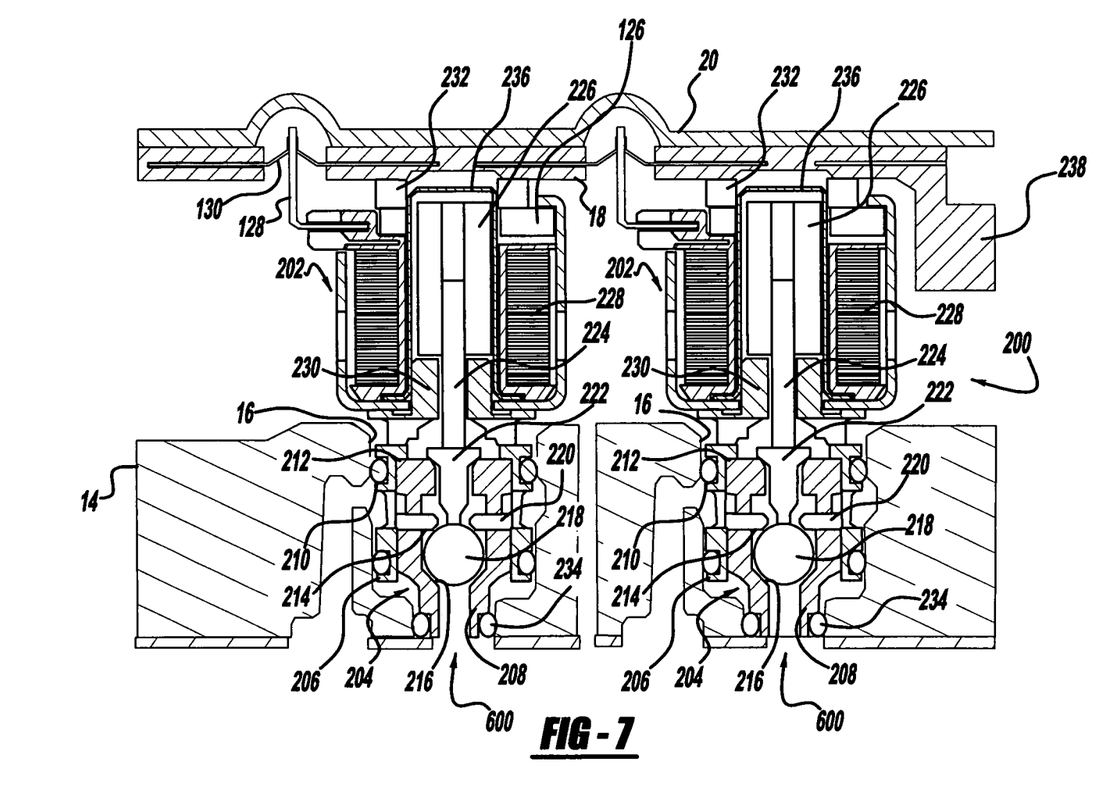
FIG. 7 illustrates a partial sectional view of the solenoid-actuated valve system.

A plunger member 222 is preferably provided that is in selective operable association with the stem member 224 (e.g., of the armature member 226) and the ball member 218. The plunger member 222 is preferably operable to engage the upper seat portion 212. In accordance with a preferred embodiment of the present invention, when the coil member 228 is energized, the armature member 226 will be urged towards the pole piece member 230, thus causing the stem member 224, and more specifically the plunger member 222, to contact the ball member 218. Conversely, when the coil member 228 is de-energized, the armature member 226 will not be urged towards the pole piece member 230, thus allowing the ball member 218 to push up the plunger member 222, and more specifically the stem member 224, which in turn will return armature member 226 to the default position. In this general manner, the valve portion 204 can be selectively manipulated to control the flow of transmission fluid through the manifold 12. An additional aspect of the present invention shown in FIG. 7, includes an arrangement wherein the valve portions of all the solenoid actuated valve members include a plunger member 222 adjacent the stem member.

In order to control the transmission of vibrations and/or noise that occurs when the valve member 200 is actuated, the present invention provides at least one, more preferably at least two, and still more preferably a plurality of isolator members 232 and/or gasket members 234 disposed about various locations of the valve member 200.

In accordance with a preferred embodiment of the present invention, an isolator member 232 is disposed about the top external surface of the sleeve member 236, i.e., disposed between the insulator member 238 and the upper flux washer member 240. Without being bound to a particular theory of the operation of the present invention, the intended purpose of the isolator member 232 is to cushion vibrations (e.g., longitudinal vibrations) of the valve portion 204 for noise reduction. The isolator member 232 is preferably comprised of a resiliently deformable material, including but not limited to rubber. Although the isolator member 232 is shown as being a substantially round member having an open middle portion, it should be appreciated that any number of suitable designs can be used in the practice of the present invention. The present design was chosen, in part, due to the desire to at least partially envelope the upper portion of the sleeve member 236 in order to cushion vibrations emanating therefrom and/or therethrough.

In accordance with a preferred embodiment of the present invention, at least one, more preferably at least two, still more preferably at least three, and most preferably a plurality of gasket members 234 (e.g., o-rings) are disposed about the external surface of the valve housing 202. Preferably, the gasket members 234 are received in the annular grooves and/or shoulder portions 212 and preferably abut the inner surfaces of the bore 16 (i.e., the manifold housing 14). Without being bound to a particular theory of the operation of the present invention, the intended purpose of the gasket members 234 is to cushion vibrations (e.g., lateral vibrations) of the valve portion 204 for noise reduction. The gasket members 234 are preferably comprised of a resiliently deformable material, including but not limited to rubber. Although the gasket members 234 are shown as being substantially round members having an open middle portion, it should be appreciated that any number of suitable designs can be used in the practice of the present invention. The present design was chosen, in part, due to the desire to at least partially encircle the various portions of the valve portion 204 in order to cushion vibrations emanating therefrom and/or therethrough.

As shown, the isolator members 144, 232, respectively, are preferably unitary members, in that, one isolator member 144 is provided for the normally applied valve member 100, and a completely separate isolator member 232 is provided for the normally vented valve member 200. In this manner, each valve member, regardless of its design or position in the manifold, can be provided with an individual isolator member, thus obviating the need for large and complex isolator member designs that must be carefully laid out to correspond to multiple valve member locations.

Figure 5A:
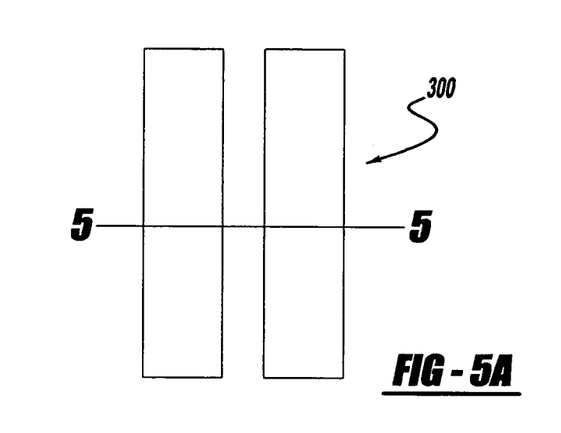
FIG. 5*a* illustrates a partial sectional view of an armature member, in accordance with a first alternative embodiment of the present invention.
Figure 5B:
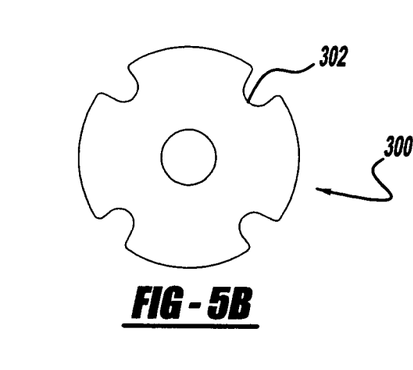
FIG. 5*b* illustrates a sectional view taken along line 5-5 of the armature member depicted in FIG. 5*a*, in accordance with a first alternative embodiment of the present invention.

Referring specifically to FIGS. 5a and 5b, there is shown an alternative design of an armature member 300, in accordance with a first alternative embodiment of the present invention. In order to achieve optimal performance of the armature member 300 traveling through the fluid (e.g., transmission fluid) in its respective sleeve member, at least one, and more preferably at least two, and most preferably a plurality of custom grooves or slots 302 were incorporated into an external surface of the armature member 300. Without being bound to a particular theory of the operation of the present invention, it is believed that the grooves 302 allow for improved response and performance under cold temperature operational conditions.

Figure 6A:
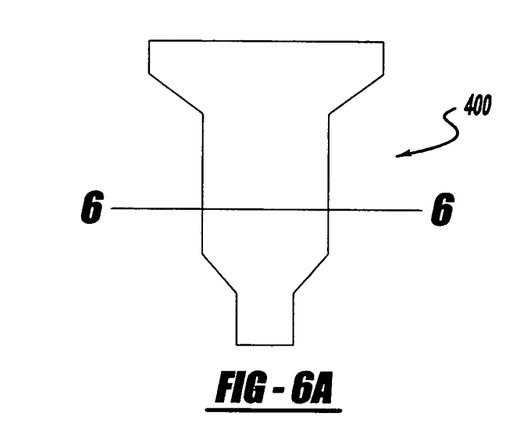
FIG. 6*a* illustrates a partial sectional view of a plunger member, in accordance with a second alternative embodiment of the present invention.
Figure 6B:
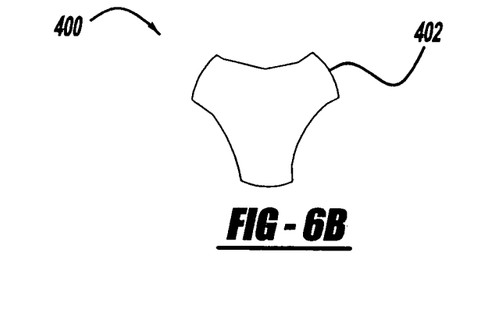
FIG. 6*b* illustrates a sectional view taken along line 6-6 of the plunger member depicted in FIG. 6*a*, in accordance with a second alternative embodiment of the present invention.

Referring specifically to FIGS. 6a and 6b, there is shown an alternative design of a plunger member 400, in accordance with a second alternative embodiment of the present invention. In order to minimize the size of the solenoid valve, a multi-fluted (e.g., 3 fluted or scalloped surfaces) plunger member 400 with scalloped flutes 402 incorporated into an external surface thereof was provided in order to provide the respective valve portion with a very low profile height, while still maximizing contact area with the bore of the upper seat for guidance and improved life, and also for maximizing the flow area through the flutes 402.

In order to further minimize the height of the valve portions of the present invention, the respective lower gasket members are retained only by the fluid pressure applied from underneath it. A screen carrier member 500 also acts as a back up retention method for the respective lower gasket members.

In order to minimize hydraulic force acting on the respective insulator member, the inlet nozzle 600 of the respective valve portions located in the respective retainer members has been minimized. Furthermore, the respective lower gasket members added to the respective retainer members are intended for the purpose of minimizing the applied force. The other two respective gasket members are preferably significantly greater in diameter than the respective lower gasket members in order to minimize the upward force when the valve member is applied, while still allowing for proper insertion of the respective gasket members into the bores. Furthermore, the hydraulic inlet nozzle 600 is preferably placed directly underneath the respective valve portions for minimized height.

The present invention was designed to be a high flow, high pressure device with a near linear, repeatable transfer function. This was done, in part, by optimizing the size of the respective seats and all the other orifices, as well as by controlling the overtravel of the armature member in the sleeve member. By way of a non-limiting example, the transfer function of the normally applied valve member was specifically designed to yield higher pressures at a 50% duty cycle level.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid-actuated valve assembly with reduced noise characteristics, comprising:
    a manifold housing member having first and second bores formed therein;
    a first solenoid-actuated valve member disposed within said first bore, said first solenoid-actuated valve member including a solenoid portion and a valve portion, said valve portion having a vertically non-secured fit within said manifold bore;
    a second solenoid-actuated valve member disposed within said second bore, said second solenoid-actuated valve member including a solenoid portion and a valve portion;
    a cover member secured to said manifold housing;
    an insulator member in proximity to said cover member and to said solenoid portions of said first and second solenoid-actuated valve members, wherein said insulator member has conduction members disposed within said insulator member for supplying energy to said solenoid portions;

a first unitary isolator member separate from and disposed between said insulator member and said solenoid portion of said first solenoid-actuated valve member, said first isolator member being in direct contact with said insulator member and said first isolator member being operable to reduce vibration transmission from said solenoid portion of said first solenoid-actuated valve member to said insulator member and said cover member;

a second unitary isolator member disposed between said insulator member and said solenoid portion of said second solenoid-actuated valve member, said second isolator member operable to reduce vibration transmission from said solenoid portion of said second solenoid-actuated valve member to said insulator member and said cover member;

a first plurality of gasket members disposed about said valve portion of said first solenoid-actuated valve member, said first plurality of gasket members operable to reduce vibration transmission from said valve portion of said first solenoid-actuated valve member to said manifold housing member; and a second plurality of gasket members disposed about said valve portion of said second solenoid-actuated valve member, said second plurality of gasket members operable to reduce vibration transmission from said valve portion of said second solenoid-actuated valve member to said manifold housing member.

2. The invention according to claim 1, wherein said solenoid portions of said first and second solenoid-actuated valve members include a selectively movable armature member and a sleeve member, wherein said armature member is at least partially received within said sleeve member, wherein a dampening portion is defined between a surface of said sleeve member and a surface of said armature member, wherein a fluid is operable to be vented into said dampening portion.

3. The invention according to claim 2, wherein said armature member includes at least one area defining an axial groove formed on an external surface thereof.

4. The invention according to claim 1, further comprising a cover plate member adjacent said insulator member.

5. The invention according to claim 1, further comprising a screen carrier member adjacent said manifold housing member.

6. The invention according to claim 1, wherein said valve portions of said first and second solenoid-actuated valve members include a retainer member disposed therein, wherein said retainer member includes first and second seat portions.

7. The invention according to claim 6, wherein said valve portions of said first and second solenoid-actuated valve members include a ball member selectively operable to contact either of said first and second seat portions.

8. The invention according to claim 7, wherein said solenoid portions of said first and second solenoid-actuated valve members include a stem member extending from said armature member, wherein said stem member is selectively operable to contact said ball member.

9. The invention according to claim 8, wherein said valve portions of said first and second solenoid-actuated valve members include a plunger member adjacent said stem member, wherein said plunger member is selectively operable to contact said ball member.

10. The invention according to claim 9, wherein said plunger member includes at least one area defining an axial scalloped flute portion formed on an external surface thereof.

11. The invention according to claim 9 wherein the valve portion has a first plurality of gasket members including at least three gaskets and wherein upper gaskets have a radius significantly greater than the radius of the lower gasket.

12. The invention according to claim 1 wherein said first isolator is positioned adjacent a flux washer.

13. The invention according to claim 1 wherein said first isolator is comprised of a polymeric material.

14. A solenoid-actuated valve assembly with reduced noise characteristics, comprising:

a manifold housing member having a first and second longitudinally extending bores formed therein;

a first solenoid-actuated valve member disposed within said first bore, said first solenoid-actuated valve member including a solenoid portion and a valve portion, said valve portion having a vertically non-secured fit within said manifold bore, said valve portion having a plunger having at least one axial scalloped surface for contacting said bore and said plunger member having at least one flow area, wherein said at least one axial scalloped surface maximizes the contact area between said plunger and said bore while maximizing the flow through said at least one flow area;

a second solenoid-actuated valve member disposed within said second bore, said second solenoid-actuated valve member including a solenoid portion and a valve portion, said valve portion having a vertically non-secured fit within said manifold bore, said valve portion having a plunger having at least one axial scalloped surface for contacting said bore and said plunger member having at least one fluid flow area, wherein said at least one axial scalloped surface maximizes the contact area between said plunger and said bore while maximizing the flow through said at least one fluid flow area;

a cover member secured to said manifold housing;

an insulator member in proximity to said solenoid portions of said first and second solenoid-actuated valve members, wherein said insulator member has conduction members disposed within said insulator member for supplying energy to said solenoid portions;

a first unitary resiliently deformable isolator member separate from and disposed between said insulator member and said solenoid portion of said first solenoid-actuated valve member, said first isolator member being in direct contact with said insulator member and said first isolator member being operable to reduce vibration transmission from said solenoid portion of said first solenoid-actuated valve member to said insulator member and said cover member;

a second unitary resiliently deformable isolator member separate from and disposed between said insulator member and said solenoid portion of said second solenoid-actuated valve member, said second isolator member being in direct contact with said insulator member and said second isolator member being operable to reduce vibration transmission from said solenoid portion of said second solenoid-actuated valve member to said insulator member and said cover member;

a first plurality of resiliently deformable gasket members disposed about said valve portion of said first solenoid-actuated valve member, said first plurality of gasket members operable to reduce vibration transmission from said valve portion of said first solenoid-actuated valve member to said manifold housing member; and a second plurality of resiliently deformable gasket members disposed about said valve portion of said second solenoid-actuated valve member, said second plurality of gasket members operable to reduce vibration transmission from said valve portion of said second solenoid-actuated valve member to said manifold housing member.

15. The invention according to claim 14, wherein said solenoid portions of said first and second solenoid-actuated valve members include a selectively movable armature member and a sleeve member, wherein said armature member is at least partially received within said sleeve member, wherein a dampening portion is defined between a surface of said sleeve member and a surface of said armature member, wherein a fluid is operable to be vented into said dampening portion.

16. The invention according to claim 15, wherein said armature member includes at least one area defining an axial groove formed on an external surface thereof.

17. The invention according to claim 14, further comprising a cover plate member adjacent said insulator member.

18. The invention according to claim 14, further comprising a screen carrier member adjacent said manifold housing member.

19. The invention according to claim 14, wherein said valve portions of said first and second solenoid-actuated valve members include a retainer member disposed therein, wherein said retainer member includes first and second seat portions.

20. The invention according to claim 19, wherein said valve portions of said first and second solenoid-actuated valve members include a ball member selectively operable to contact either of said first and second seat portions.

21. The invention according to claim 20, wherein said solenoid portions of said first and second solenoid-actuated valve members include a stem member extending from said armature member, wherein said stem member is selectively operable to contact said ball member.

22. The invention according to claim 21, wherein said valve portions of said first and second solenoid-actuated valve members include a plunger member adjacent said stem member, wherein said plunger member is selectively operable to contact said ball member.

23. A solenoid-actuated valve assembly with reduced noise characteristics, comprising:
a manifold housing member having at least two bores formed therein;
at least two solenoid-actuated valve members disposed within said bores, said solenoid-actuated valve members including a solenoid portion and a valve portion, said valve portion having a vertically non-secured fit within said manifold bore, said valve portion having a plunger having at least one axial scalloped surface for contacting said bore and said plunger member having at least one flow area, wherein said at least one axial scalloped surface maximizes the contact area between said plunger and said bore while maximizing the flow through said at least one flow area;
a cover member secured to said manifold housing;
an insulator member in proximity to said solenoid portions of said solenoid-actuated valve members, wherein said insulator member has conduction members disposed within said insulator member for supplying energy to said solenoid portions;
at least two unitary isolator members, each of which are separate from and disposed between said insulator member and each of said solenoid portions, said isolator members being in direct contact with said insulator member and said isolator members being operable to reduce vibration transmission from said solenoid portions to said insulator member and said cover member; and
at least two gasket members, each of which are disposed about said valve portions, said gasket members operable to reduce vibration transmission from said valve portions to said manifold housing member.

24. The invention according to claim 23, wherein said solenoid portion includes a selectively movable armature member and a sleeve member, wherein said armature member is at least partially received within said sleeve member, wherein a dampening portion is defined between a surface of said sleeve member and a surface of said armature member, wherein a fluid is operable to be vented into said dampening portion.

25. The invention according to claim 24, wherein said armature member includes at least one area defining an axial groove formed on an external surface thereof.

26. The invention according to claim 23, further comprising a cover plate member adjacent said insulator member.

27. The invention according to claim 23, further comprising a screen carrier member adjacent said manifold housing member.

28. The invention according to claim 23, wherein said valve portion includes a retainer member disposed therein, wherein said retainer member includes first and second seat portions.

29. The invention according to claim 28, wherein said valve portion includes a ball member selectively operable to contact either of said first and second seat portions.

30. The invention according to claim 29, wherein said solenoid portion includes a stem member extending from said armature member, wherein said stem member is selectively operable to contact said ball member.

31. The invention according to claim 30, wherein said valve portion includes a plunger member adjacent said stem member, wherein said plunger member is selectively operable to contact said ball member.

* * * * *